(12) United States Patent
Gershenfeld et al.

(10) Patent No.: US 8,742,794 B2
(45) Date of Patent: Jun. 3, 2014

(54) ANALOG LOGIC AUTOMATA

(75) Inventors: Neil Gershenfeld, Somerville, MA (US); Kailiang Chen, Cambridge, MA (US); Jonathan Leu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 588 days.

(21) Appl. No.: 12/422,491

(22) Filed: Apr. 13, 2009

(65) Prior Publication Data
US 2010/0033228 A1 Feb. 11, 2010

Related U.S. Application Data

(60) Provisional application No. 61/123,985, filed on Apr. 11, 2008, provisional application No. 61/123,809, filed on Apr. 11, 2008, provisional application No. 61/192,178, filed on Sep. 16, 2008.

(51) Int. Cl.
*H03K 19/173* (2006.01)
*G06G 7/28* (2006.01)

(52) U.S. Cl.
USPC .............................................. 327/34; 326/38

(58) Field of Classification Search
USPC ....................................... 327/334; 326/37–43
See application file for complete search history.

(56) References Cited

U.S. PATENT DOCUMENTS

| | | |
|---|---|---|
| 4,068,214 A | 1/1978 | Patil |
| 4,464,726 A | 8/1984 | Chiang |
| 4,468,727 A | 8/1984 | Carrison et al. |
| 4,700,187 A | 10/1987 | Furtek |
| 5,105,424 A | 4/1992 | Flaig et al. |
| 5,140,670 A | 8/1992 | Chua |
| 5,243,238 A | 9/1993 | Kean |
| 5,675,808 A | 10/1997 | Gulick et al. |
| 6,378,068 B1 | 4/2002 | Foster et al. |
| 6,549,658 B1 | 4/2003 | Schweid et al. |
| 6,954,163 B2 * | 10/2005 | Toumazou et al. ........... 341/144 |
| 7,212,640 B2 * | 5/2007 | Bizjak .......................... 381/106 |
| 2001/0025227 A1 | 9/2001 | Ajiro |
| 2007/0194807 A1 | 8/2007 | Reblewski et al. |
| 2007/0260805 A1 | 11/2007 | Siemers |
| 2008/0061823 A1 | 3/2008 | Schmit et al. |

OTHER PUBLICATIONS

International Search Report and Written Opinion of the International Searching Authority, PCT App. No. PCT/US2009/040327, Dec. 3, 2009.

* cited by examiner

*Primary Examiner* — Dinh T. Le
(74) *Attorney, Agent, or Firm* — Norma E. Henderson

(57) ABSTRACT

A distributed, reconfigurable statistical signal processing apparatus comprises an array of discrete-time analog signal processing circuitry for statistical signal processing based on a local message-passing algorithm and digital configuration circuitry for controlling the functional behavior of the array of analog circuitry. The input signal to the apparatus may be expressed as a probabilistic representation. The analog circuitry may comprise computational elements arranged in a network, with a receiving module that assigns probability values when an input signal arrives and communicates the probability values to one of the computational elements, the computational elements producing outputs based on the assigned probability values. The signal processing apparatus may be an analog logic automata cell or an array of cells, wherein each cell is able to communicate with all neighboring cells.

13 Claims, 13 Drawing Sheets

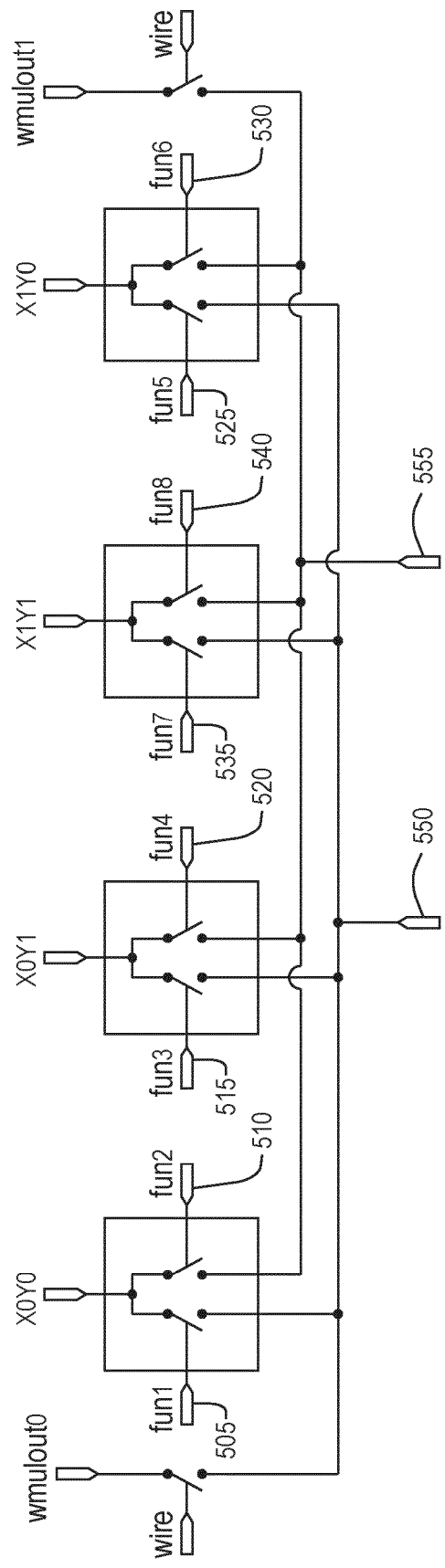

ANALOG LOGIC AUTOMATA

RELATED APPLICATIONS

This application claims the benefit of U.S. Provisional Application Ser. No. 61/123,985, filed Apr. 11, 2008, the entire disclosure of which is herein incorporated by reference. This application also claims the benefit of U.S. Provisional Application Ser. No. 61/123,809, filed Apr. 11, 2008, and U.S. Provisional Application Ser. No. 61/192,178, filed Sep. 16, 2008, the entire disclosures of which are herein incorporated by reference.

STATEMENT REGARDING FEDERALLY SPONSORED RESEARCH OR DEVELOPMENT

This invention was made with U.S. government support under Grant Number CCF-0122419, awarded by the National Science Foundation, and Contract Number H94003-07-2-0707, awarded by the Department of Defense. The government has certain rights in this invention.

FIELD OF THE TECHNOLOGY

The present invention relates to logic circuits, cellular automata, and computation models and, in particular, to analog logic cellular automata.

BACKGROUND

Today's most advanced computers are used to model physical systems, such as, for example, the folding of a protein or the circulation of the global climate, but they are also physical systems themselves. The demands of high-performance computing have driven the frontiers of device physics from vacuum tubes to semiconductor heterostructures. Between these simulated and physical realities lie many layers of abstraction: materials are assembled into devices, devices into circuits, circuits into boards, boards into cases, cases into racks, and racks into systems, and, in corresponding layers of software, applications are implemented in algorithms, written in a high-level language, compiled into microcode, scheduled by an operating system, and then executed by processors.

Most computer science programming models hide the underlying physical reality of computation, and the corresponding layers of software serve to insulate programs and programmers from knowledge of the physical construction of the computer. This division of labor is now being challenged by the growing complexity of computing systems. While device performance has been improving exponentially for decades and has a firm future roadmap [Paul S. Peercy, "The Drive to Miniaturization", Nature (406), pp. 1023-26 (2000)], this has not been true for software. Rather, cost overruns, shipping delays, and bugs have been recurring features of development efforts ranging from taping out chips to delivering operating systems. Along with programmer productivity, system scaling obstacles include interconnect bottlenecks and prohibitive power requirements.

As information technologies scale down in device size and up in system complexity, their computational and physical descriptions converge as the number of information-bearing degrees of freedom becomes comparable to the number of physical ones. It is already possible to store data in atomic nuclei and to use electron bonds as logical gates [N. Gershenfeld and I. Chuang, "Bulk Spin Resonance Quantum Computation", Science (275), pp. 350-356 (1997)]. In such a computer, the information-bearing degrees of freedom are the same as the physical ones, and it is no longer feasible to account for them independently. The universe executes in linear time, independent of its size. A scalable computer architecture must similarly reflect the scaling of its contents. An explicit description of the spatial distribution, propagation, and interaction of information in a computer program offers portability across device technologies (which must satisfy the same physical laws), scalability across machine sizes (because physical dynamics are inherently parallel), and simplification of fabrication (since causality implies locality).

The performance of a computer is limited by the bandwidth and latency of the connection between where data is stored and where it is processed. Early computers were far more limited by speed and availability of processing and memory than the performance of the connections between them. Von Neumann or Harvard-style computer architectures, where for each cycle data is transmitted to and manipulated in a central processing unit, are well suited for computers built from slow and expensive processing elements (i.e. vacuum tubes) and comparatively fast and cheap communication (wires). However, faster modern building blocks (smaller transistors, improved logic families, and other emerging technologies) have outpaced the rate that data can be fetched from memory. The operating speeds of many modern computers are beyond even the relativistic limits for data to be retrieved from an arbitrary location in a single cycle. In modern computers, it can take hundreds or even thousands of cycles to fetch a piece of data. There are a wide variety of techniques that have been developed to anticipate what data will be needed and load it ahead of time (pipelining, caching, instruction reordering, branch prediction, speculative execution, etc.), but the availability and behavior of these features can vary widely from processor to processor as can their effectiveness with different program behaviors. Although the Von Neumann abstraction is a familiar model of computation, in order to write software that takes advantage of the aggressive performance possible with modern (and future) technologies, fundamentally different models of computation will be needed, as well as computer architectures that can efficiently run them.

Information in physics is an extensive quantity. Like mass, it scales with the system size. For a computer to do the same, it must be uniform, unlike the inhomogeneous combinations of processors, memory, storage, and communications that are the norm today. For this reason, cellular architectures have long been attractive as a model for computation [J. von Neumann, "Theory of Self-Reproducing Automata", edited by A. W. Burks, Univ. of Illinois Press (Urbana, 1966)], and more recently for its implementation [M. Sipper, "The Emergence of Cellular Computing", Computer (32), pp. 18-26 (1999)]. "Cellular Automata" was originally a discrete model in which space, time, and states were discretized, and update rules were carefully designed for studying complex phenomena [Neil Gershenfeld (1999), "The Nature of Mathematical Modeling", Cambridge, UK: Cambridge University Press]. Cellular automata were found to be quite successful in modeling physical interactions governed by differential equations in a continuum limit, such as, for example, lattice gases for hydrodynamics [U.S. Pat. No. 6,760,032; U. Frisch, B. Hasslacher, and Y. Pomeau, "Lattice-Gas Automata for the Navier-Stokes Equation", Phys. Rev. Lett. (56), pp. 1505-1508 (1986)] and spin dynamics [E. Domany and W. Kinzel, "Equivalence of Cellular Automata to Ising Models and Directed Percolation", Phys. Rev. Lett. (53), pp. 311-314 (1984)]. Because of this great potential of computing as a physical system, cellular automata present a practical architecture for computation [N. Margolus, "Physics-Like Models of Computation", Physica D (10), pp. 81-95 (1984)].

Relevant research in the 1970s demonstrated that universal Boolean logic could be implemented in cellular automata with one-bit states and just three local rules [R. E. Banks, "Information Processing and Transmission in Cellular Automata", Ph.D. thesis, MIT (1971)]. The Banks Boolean cellular automata has only three rules, acting in 2D on one-bit states with 4 rectangular neighbors. The simplicity in primitive functioning unit, however, led to complexity in the implementation of wires and gates. In such a system, the logic functions are distributed, requiring many cells to realize them. The generality of a cellular automata's rule table allows many other behaviors to be modeled, such as hydrodynamics or graphics. Many more variants of cellular automata models/applications [see, e.g., U.S. Pat. No. 6,910,057] and hardware implementations [see, e.g., U.S. Pat. No. 7,509,479; U.S. Pat. No. 5,243,238] have been proposed. All of these implementations are based on Boolean logic.

If the goal is just computation, then this can be implemented more compactly in "logic automata" in which every cell can contain a logic gate and store its state, locally providing the interactions needed for computational universality. Logic automata are a subset of cellular automata [N. Gershenfeld, The Nature of Mathematical Modeling, Cambridge University Press, 1999] and quantize space and time with distributed cells connected locally, each performing a basic logic operation. Logic automata are therefore scalable, universal for digital computation [R. E. Banks, Information Processing and Transmission in Cellular Automata, Ph.D. thesis, Massachusetts Institute of Technology, 1971], and reflect the nature of many complex physical and biological systems [D. A. Dalrymple, N. Gershenfeld, and K. Chen, "Asynchronous logic automata," Proceedings of AUTOMATA 2008 (14th International Workshop on Cellular Automata), pp. 313-322, June 2008; L. O. Chua, "CA belongs to CNN," invited talk at AUTOMATA 2008 (14th International Workshop on Cellular Automata), June 2008]. Logic automata form a family of computer architectures that expose a cartoon version of physics that is easy for a programmer to work with but maintains the underlying physical relationship between the size of logic elements, their computation rates, and signal travel speeds. This allows programmers to work with abstractions that will have well defined behavior for both correctness and performance, regardless of which underlying technology is used to fabricate it.

Analog logic circuits are a class of analog circuits for statistical signal processing, in which an associated inference problem is dynamically solved by locally propagating probabilities in a message-passing algorithm [U.S. Pat. No. 7,209,867; H.-A. Loeliger, F. Lustenberger, M. Helfenstein, and F. Tarkoy, "Probability propagation and decoding in analog VLSI", IEEE Trans. Inform. Theory, 47:837-843, Feburary 2001; Benjamin Vigoda, "Analog Logic: Continuous-Time Analog Circuits for Statistical Signal Processing", PhD thesis, Massachusetts Institute of Technology, June 2003; Xu Sun, "Analogic for Code Estimation and Detection", M. Sc thesis, Massachusetts Institute of Technology, September 2005]. From the mathematical optimization point of view, the inference problem is a special kind of mathematical optimization problem with constraints that include axioms of probability theory. Although the question of how to construct physical systems to solve the inference problem with various combinations of very low power, extremely high speed, low cost, and very limited physical resources is still an open research topic, message-passing algorithms [Hans-Andrea Loeliger, "Introduction to factor graph", IEEE Signal Processing Mag., January 2004; F. R. Kschischang, B. J. Frey, and H.-A. Loeliger, "Factor graphs and the sumproduct algorithm", IEEE Trans. Inform. Theory, 47:498-519, February 2001; Yedidia, J. S. and Freeman, W. T. and Weiss, Y., "Constructing free-energy approximations and generalized belief propagation algorithms", IEEE Transactions on Information Theory, vol. 51(7), pp. 2282-2312, July 2005] approach this question by locally passing messages on a factor graph. The messages can be mapped into physical degrees of freedom like voltages and currents. The local constraints on the factor graph are the computation units implemented by a class of analog statistical signal processing circuit.

Digital computation avoids and corrects errors by sacrificing continuous degrees of freedom. Analog logic circuits recover this freedom by relaxing the digital states, with each device doing computation in the analog domain, and only quantizing at the output [B. Vigoda, Analog Logic: Continuous-Time Analog Circuits for Statistical Signal Processing, Ph.D. thesis, Massachusetts Institute of Technology, June 2003]. The analog representations come from either describing digital (binary) random variables with their probability distributions in a digital signal processing problem, or from relaxing binary constraints of an integer programming problem. The preserved information from this analog computation scheme for digital problems gives rise to robust, high-speed, low-power, and cost-effective hardware. Circuit realization examples include decoders [H.-A. Loeliger, F. Lustenberger, M. Helfenstein, and F. Tarkoy, "Probability propagation and decoding in analog VLSI," Information Theory, IEEE Transactions on, vol. 47, no. 2, pp. 837-843, February 2001] and the Noise-Locked Loop (NLL) for direct-sequence spread-spectrum acquisition and tracking, which promise order-of-magnitude improvement over digital realizations [B. Vigoda, J. Dauwels, M. Frey, N. Gershenfeld, T. Koch, H.-A. Loeliger, and P. Merkli, "Synchronization of Pseudorandom Signals by Forward-Only Message Passing With Application to Electronic Circuits," Information Theory, IEEE Transactions on, vol. 52, no. 8, pp. 3843-3852, August 2006].

In a Noise-Locked Loop (NLL) for synchronization to a Linear Feedback Shift Register (LFSR) [U.S. Pat. No. 5,612,973; U.S. Pat. No. 5,729,388; Benjamin Vigoda, "Analog Logic: Continuous-Time Analog Circuits for Statistical Signal Processing", PhD thesis, Massachusetts Institute of Technology, June 2003; Xu Sun, "Analogic for Code Estimation and Detection", M. Sc thesis, Massachusetts Institute of Technology, September 2005], the application first formulates a particular decoding synchronization problem into a statistical inference problem, and then applies local message-passing algorithm as the solution to the problem. With a proper representation of these statistical binary variables, the implementation of the message-passing algorithm can be reduced to a series of operations of multiplication and summation. Thus, a hardware realization can be built with a Gilbert Multiplier, exploiting the well-known Translinear principle. This work shows that NLL implemented in analog logic can perform direct-sequence spread-spectrum acquisition and tracking functionality and promises orders-of-magnitude win over digital implementations. These analog logic circuits are, however, custom and special-purposed, and no reconfigurable analog logic has yet been reported.

SUMMARY

A distributed reconfigurable hardware for applications such as signal processing, coding decoding, and image processing employs features of analog logic in the context of cellular automata architecture. Analog Logic Automata hardware according to the present invention provides a continuous-state, discrete-time computation model for modeling and solving digital signal processing problems by implementing local message-passing algorithms in a programmable fashion. Extremely high speed, low power, and high performance operation are attained in this computational hardware model by relaxing the discrete variables into continuous domain and taking up Bayesian inference algorithms that have locality attributes.

In one aspect of the present invention, a distributed, reconfigurable statistical signal processing apparatus comprises an array of discrete-time analog signal processing circuitry for statistical signal processing based on a local message-passing algorithm and digital configuration circuitry for controlling the functional behavior of the array of analog circuitry. The input signal to the apparatus may be expressed as a probabilistic representation. The analog circuitry may comprise computational elements arranged in a network, with a receiving module that assigns probability values when an input signal arrives and communicates the probability values to one of the computational elements, the computational elements producing outputs based on the assigned probability values. The signal processing apparatus may be an analog logic automata cell or an array of cells, wherein each cell is able to communicate with all neighboring cells.

In another aspect of the present invention, an analog logic automata cell comprises discrete-time analog signal processing circuitry operating according to a local message-passing algorithm and digital configuration circuitry for controlling the functional behavior of the analog circuitry. An analog logic automata array comprises an array of analog logic automata cells, each cell being capable of communication with all neighboring cells.

BRIEF DESCRIPTION OF THE DRAWINGS

Other aspects, advantages and novel features of the invention will become more apparent from the following detailed description of the invention when considered in conjunction with the accompanying drawings wherein:

FIG. 3 is a function table for an exemplary soft EQUAL gate, used for determining the probability of two input signals being equal, according to one aspect of the present invention;

FIG. 4 is a function table for an exemplary soft UNEQUAL gate, used for determining the probability of two input signals being different, according to one aspect of the present invention;

FIG. 5 depicts an exemplary switching structure for steering output current from a Gilbert Multiplier to a Z output, according to one aspect of the present invention;

DETAILED DESCRIPTION

Figure 1:
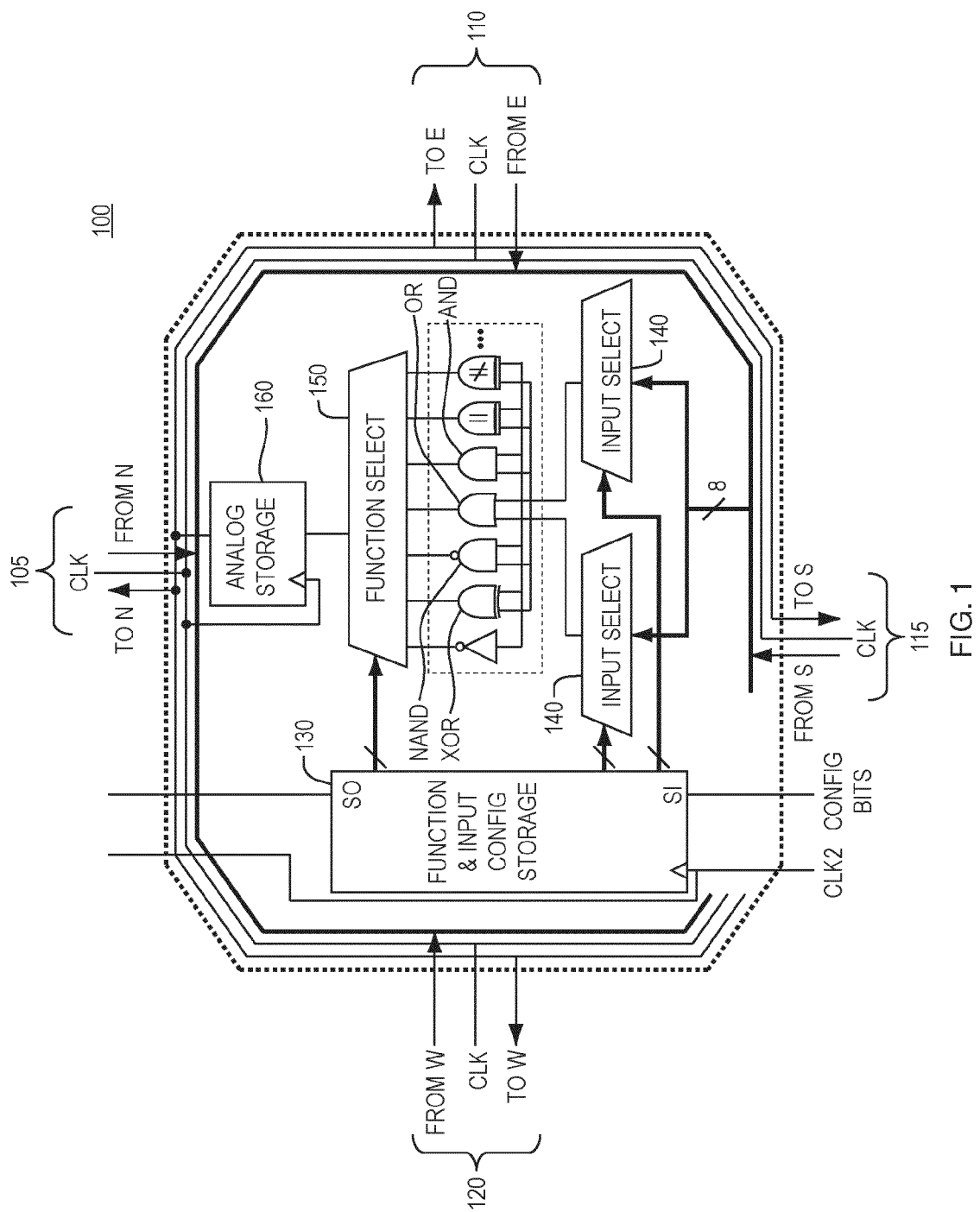
FIG. 1 is a functional block diagram of an exemplary embodiment of an Analog Logic Automata cell with rectangular neighbors and programmable functionality, according to one aspect of the present invention.

A distributed reconfigurable hardware for applications such as signal processing, coding decoding, and image processing employs features of analog logic in the context of cellular automata architecture. Previous logic automata implementations have been digital, but the Analog Logic Automata of the present invention preserve the information contained between "0" and "1". Analog Logic Automata hardware according to the present invention provides a continuous-state, discrete-time computation model for modeling and solving many different digital signal processing problems by implementing local message-passing algorithms in a programmable fashion. Extremely high speed, low power, and high performance operation are attained in this computational hardware model by relaxing the discrete variables into continuous domain and taking up Bayesian inference algorithms that have locality attributes.

Analog logic circuits work in digital problems by using an analog representation of the digital variables, relaxing the state space of the digital system from the vertices of a hypercube to the interior. This provides speed, power, and accuracy over digital implementations. Logic automata are distributed, scalable, and programmable digital computation media with local connections and logic operations. Analog Logic Automata relax the binary constraints on digital logic automata states and introduce programmability into analog logic circuits. The localized interaction and scalability of Analog Logic Automata provide a new way to do neuromorphic engineering, enabling systematic designs in a digital work flow.

Analog Logic Automata combine analog logic and cellular automata. Since message-passing algorithm is capable of a wide range of different inference problems, analog logic hardware can be very universal once made reconfigurable. Cellular automata architecture is generally formulated and implemented as a completely discrete-state, discrete-time model. However, recognizing that the most fundamental characteristic in a cellular automata model is the emphasis of locality and distributed interaction, the present invention relaxes the discrete states in a cellular automata model into continuous counterpart, and take advantage of the unique efficiency of analog logic to construct a reconfigurable Analog Logic Automata.

Analog Logic Automata circuits are realized by replacing digital processing circuits in logic automata with analog logic circuits, while preserving reconfigurable connectivity and functionality. To solve a signal processing problem, the target problem is formulated into a message-passing algorithm [F. R. Kschischang, B. J. Frey, and H.-A. Loeliger, "Factor graphs and the sum-product algorithm," Information Theory, IEEE Transactions on, vol. 47, no. 2, pp. 498-519, February 2001], and the Analog Logic Automata unit is programmed accordingly to fulfill the computation with analog logic circuits. Another class of problems that can be mapped onto Analog Logic Automata hardware is binary integer programming problems, in which the Analog Logic Automata unit is a relaxation over logic automata and all constraints on binary state variables are relaxed, turning integer programming into linear programming.

In a preferred embodiment, an Analog Logic Automata array according to the present invention is a continuous-value, discrete-time model, being able to communicate with its North, East, South, and West neighbors in a rectangular grid. Each cell in an array stores an analog state Z and interacts with its Von Neumann neighborhood. The cell's X and Y inputs can be any combination of the outputs from its four neighbors, the current state of the cell itself, or external inputs, depending on the connection configuration. In every clock phase, each cell performs an analog logic computation according to its function configuration. The cell state is updated and accessible to neighboring cells in the next clock phase.

FIG. 1 is a functional block diagram of an exemplary embodiment of an Analog Logic Automata cell with rectangular neighbors and programmable functionality, according to one aspect of the present invention. In FIG. 1, cell 100 communicates to and from North 105, East 110, South 115, and West 120 neighbors. Each cell 100 comprises circuitry to implement function and input configuration storage 130, input selection 140, function selection 150, and analog storage 160.

The message-passing (also known as "sum-product" algorithm or "belief propagation" algorithm) and its approximations, such as max-product algorithm, is carried out by local message passing on a probabilistic graphical model (factor graph, for example) represented by the array. Theoretical research shows that the message-passing algorithm is a very broad model and can generalize a number of statistical signal processing algorithms. In particular, decoding algorithms and LFSR synchronization problems can be modeled as Bayesian estimation with sum-product algorithm, in which basic operations are multiplication and addition. Each time step, each cell of the cellular automata array takes in two inputs: X and Y. Each input is a discrete valued random variable (typically binary random variable) with a probability distribution of $$P(X = x_i), i = 1, \ldots n, \text{ subject to } \sum_{i=1}^{n} P(X = x_i) = 1,$$

and in which X can take on n possible value, namely $\{x_1, \ldots, x_n\}$. The value of the probability is assumed to be within the range of [0, 1], and can be represented by circuit using n currents/voltages normalized to a total current/voltage. When the two inputs, represented in some form of analog value, are fed into the cell, there is a computation unit in charge of computing the right value of a certain operation and output the outcome with a proper representation. Since the output is some function of two random variables, the output should also be represented by a continuous value normalized.

As specified in the model, all state variables, e.g. X, Y and Z, can be viewed as binary random variables. In current-mode circuits, the probability distributions are represented by $$I_{Z1} \propto P(Z=1) = P_Z(1),$$

$$I_{Z0} \propto P(z=0) = P_Z(0).$$

With the above representation, the message-passing algorithms are reduced to a series of summations and multiplications. The summation over several variables is implemented by merging their respective currents, which effectively takes average on probability distributions of those random variables. In a preferred embodiment, the multiplication units are programmable soft gates implemented with Gilbert Multipliers [F. Lustenberger, On the Design of Analog VLSI Iterative Decoders, Doctoral Dissertation, Swiss Federal Institute of Technology, November 2000].

In a preferred embodiment, only 2-input soft gates are used in the Analog Logic Automata architecture because they suffice for all required computations. While it is possible to build cellular automata array working on random variables other than binary ones, many applications employ binary valued random variables. In a preferred implementation of a cellular automata array for binary random variable processing, the two cell inputs X and Y are modeled as four currents proportional to the four probability terms: P(X=1), P(X=0), P(Y=1), P(Y=0). Since the message-passing algorithm requires the capability of doing multiplication on the probability input, a Gilbert Multiplier with current mode operation can be employed.

Figure 2:
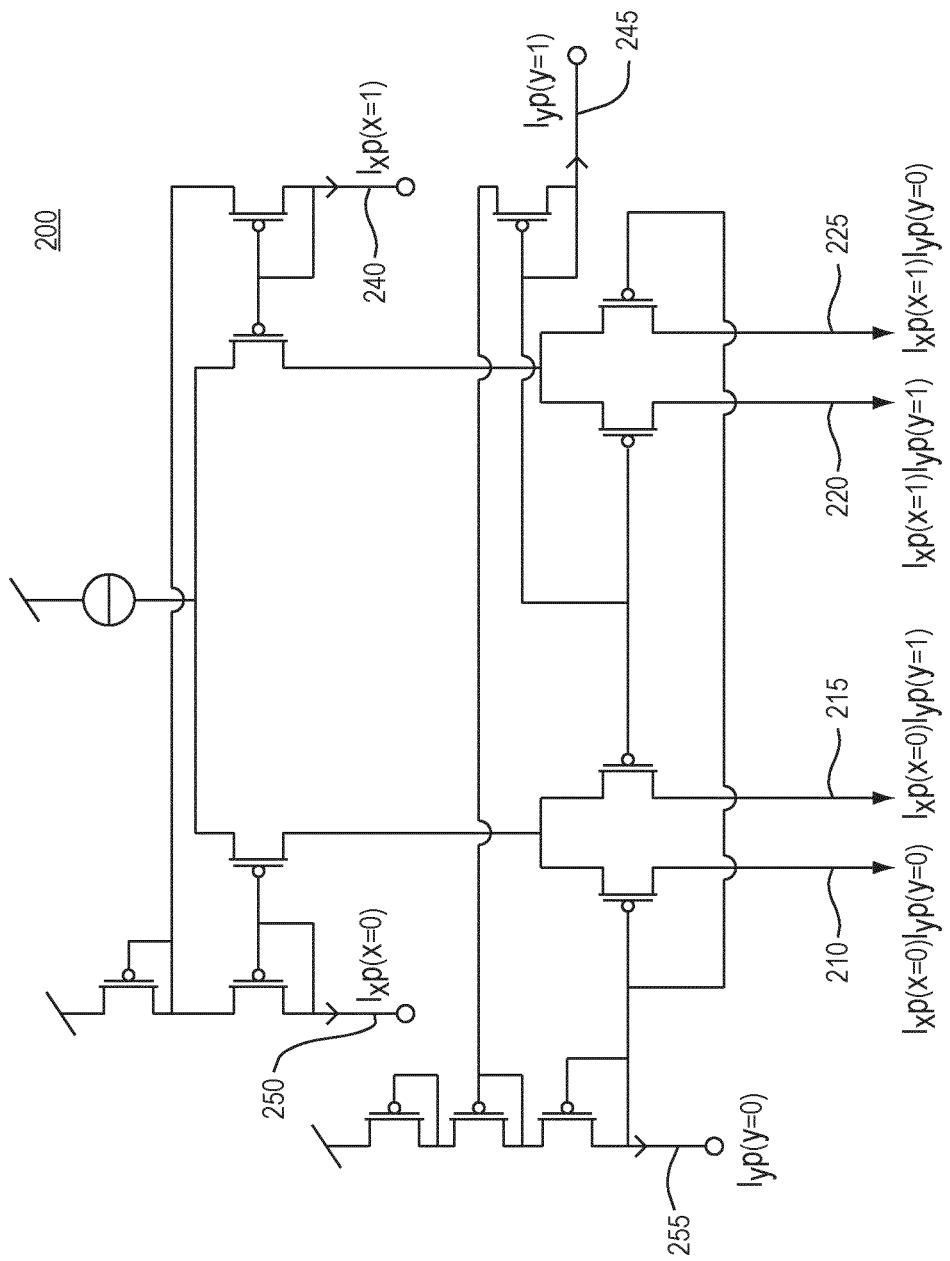
FIG. 2 is the schematic of an exemplary Gilbert Multiplier for use as the core functional unit in a cellular automata cell for multiplication, according to one aspect of the present invention.

FIG. 2 is the schematic of an exemplary Gilbert Multiplier for use as the core functional unit in a cellular automata cell for multiplication. In FIG. 2, the output of multiplier 200 is the collection of four multiplication terms 210, 215, 220, 225 of the four input variables 240, 245, 250, 255. This complete combination of multiplication provides all possible realization of binary functions with two binary inputs. Since addition of two resulting currents can be conveniently realized by joining two wires together, the cell's function can be programmed by selectively steering to and merging currents at the cell output port.

One exemplary embodiment implements an XOR gate using an analog logic gate. An XOR gate performs the mod-2 addition function. In a conventional digital circuit, the inputs and output of the XOR gate are deterministic, i.e., either "0" or "1", so the implementation uses a current $I_X(X=1)=0$ for logical "0", and a current $I_X(X=0)=I_{tot}$ for logical "1" (or vise versa). In an analog logic XOR gate ("soft XOR gate"), the inputs to the gate are actually determined by the current proportionally to the probability that the input is logical "1" or logical "0". As a practical matter, the current thus ranges between 0% and 100% of the full current, with the constraint that the probabilities for any set of corresponding inputs or outputs must sum to 100%.

For example, a two-input soft XOR gate performs a statistical version of the XOR operation. The soft XOR gate function can be written as:

$$P_Z(0) = P_X(0) \cdot P_Y(0) + P_X(1) \cdot P_Y(1)$$

$$P_Z(1) = P_X(1) \cdot P_Y(0) + P_X(0) \cdot P_Y(1)$$

By connecting wires $I_X p(X=0) \cdot I_Y p(Y=0)$ and $I_X p(X=1) \cdot I_Y p(Y=1)$ together to output as $I_Z p(Z=0)$, and wires $I_X p(X=0) \cdot I_Y p(Y=1)$ and $I_X p(X=1) \cdot I_Y p(Y=0)$ together to output as $I_Z p(Z=1)$, the gate performs an XOR operation. The probability distribution of Z is derived from probability distributions of X and Y, as in:

$$\begin{bmatrix} P_Z(1) \\ P_Z(0) \end{bmatrix} = \begin{bmatrix} P_X(1) \cdot P_Y(0) + P_X(0) \cdot P_Y(1) \\ P_X(0) \cdot P_Y(0) + P_X(1) \cdot P_Y(1) \end{bmatrix}.$$

Similarly, many more soft gates with digital equivalents, including, but not limited to, two-input soft AND, NAND, OR, and NOR gates, and a one-input soft Inverter, can be implemented. For example, the soft AND gate has the following expression:

$$P_Z(0) = P_X(0) \cdot P_Y(0) + P_X(0) \cdot P_Y(1) + P_X(1) \cdot P_Y(0)$$

$$P_Z(1) = P_X(1) \cdot P_Y(1)$$

It is realized by connecting wires $I_X p(X=0) \cdot I_Y p(Y=0)$, $I_X p(X=0) \cdot I_Y p(Y=1)$ and $I_X p(X=1) \cdot I_Y p(Y=0)$ together to output $I_Z p(Z=0)$, and
wire $I_X p(X=1) \cdot I_Y p(Y=1)$ to output as $I_Z p(Z=1)$.

Soft gates without digital counterparts may also be implemented. Examples are the soft EQUAL gate, which is used to determine the probability that two input signals are equal, and its complement, a soft UNEQUAL gate, which is used for determining the probability of two input signals being different. The two-input soft EQUAL gate, which is frequently used when independent information from two random variables is combined, indicating how similar these variables are, is defined as:

$$\begin{bmatrix} P_Z(1) \\ P_Z(0) \end{bmatrix} = \gamma \begin{bmatrix} P_X(1) \cdot P_Y(1) \sim \\ P_X(0) \cdot P_Y(0). \end{bmatrix}$$

where $\gamma$ is the normalization factor satisfying $P_Z(1) + P_Z(0) = 1$. The function table for an exemplary soft EQUAL gate is shown in FIG. 3. The soft EQUAL gate is implemented by only connecting wire $I_X p(X=0) \cdot I_Y p(Y=0)$ to output $I_Z p(Z=0)$; and
wire $I_X p(X=1) \cdot I_Y p(Y=1)$ to output as $I_Z p(Z=1)$. The other current outputs are discarded. The soft UNEQUAL gate is defined as:

$$\begin{bmatrix} P_Z(1) \\ P_Z(0) \end{bmatrix} = \gamma \begin{bmatrix} P_X(1) \cdot P_Y(0) \sim \\ P_X(0) \cdot P_Y(1) \end{bmatrix}$$

where $\gamma$ is the normalization factor satisfying $P_Z(1) + P_Z(0) = 1$. The function table for an exemplary soft UNEQUAL gate is shown in FIG. 4.

All of the above functions can be implemented as a programmable cell with switching structure, such as in the exemplary embodiment of FIG. 5. FIG. 5 depicts an exemplary switching structure for steering output current from the Multiplier to the Z output. In FIG. 5, control signals fun1 505, fun2 510, fun3 515, fun4 520, fun5 525, fun6 530, fun7 535, and fun8 540 decide where the current is output. Currents are steered to either z0 550 or z1 555, or are simply discarded. Turning on two switches from the same input branch is prohibited.

Figure 6:
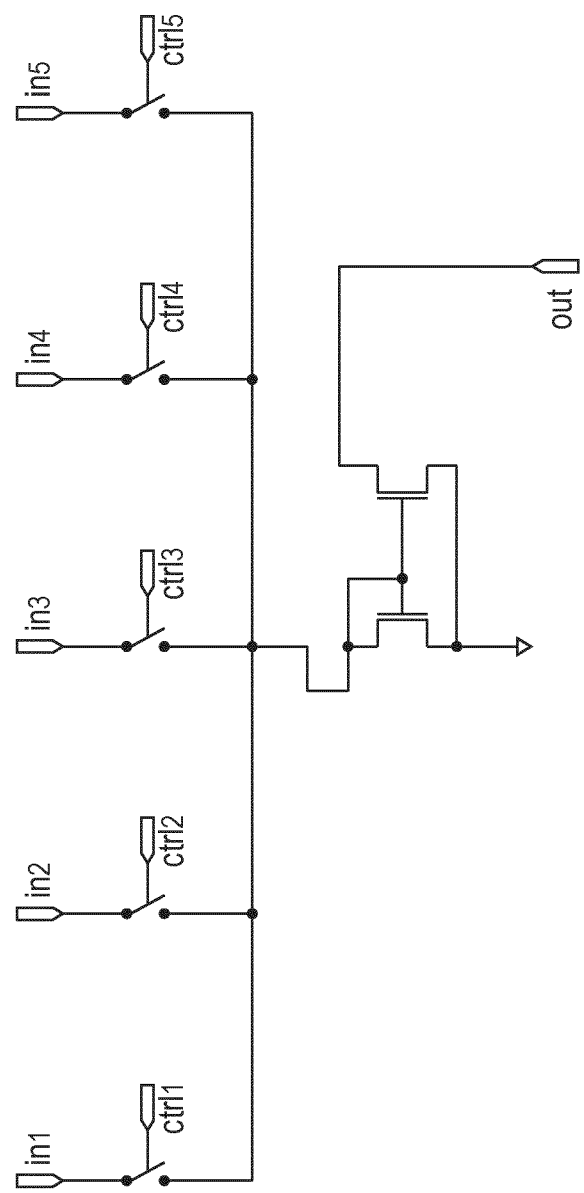
FIG. 6 depicts an exemplary switching structure for the possible input combinations for a cell, according to one aspect of the present invention.

The X input to an Analog Logic Automata cell can be the states of the cell's neighbors, external inputs, or the average of some or all of the possible input sources. The Y input can be the state of the cell's neighbors, the cell's current state, or some average of these sources. These states are actually continuous states, represented by P(X=1) & P(X=0), as in analog logic. FIG. 6 depicts an exemplary switching structure for the possible input combinations for a cell, including the four neighboring cells' states, the cell's own state, external inputs, or an average of some or all of those possible input sources.

Figure 7:
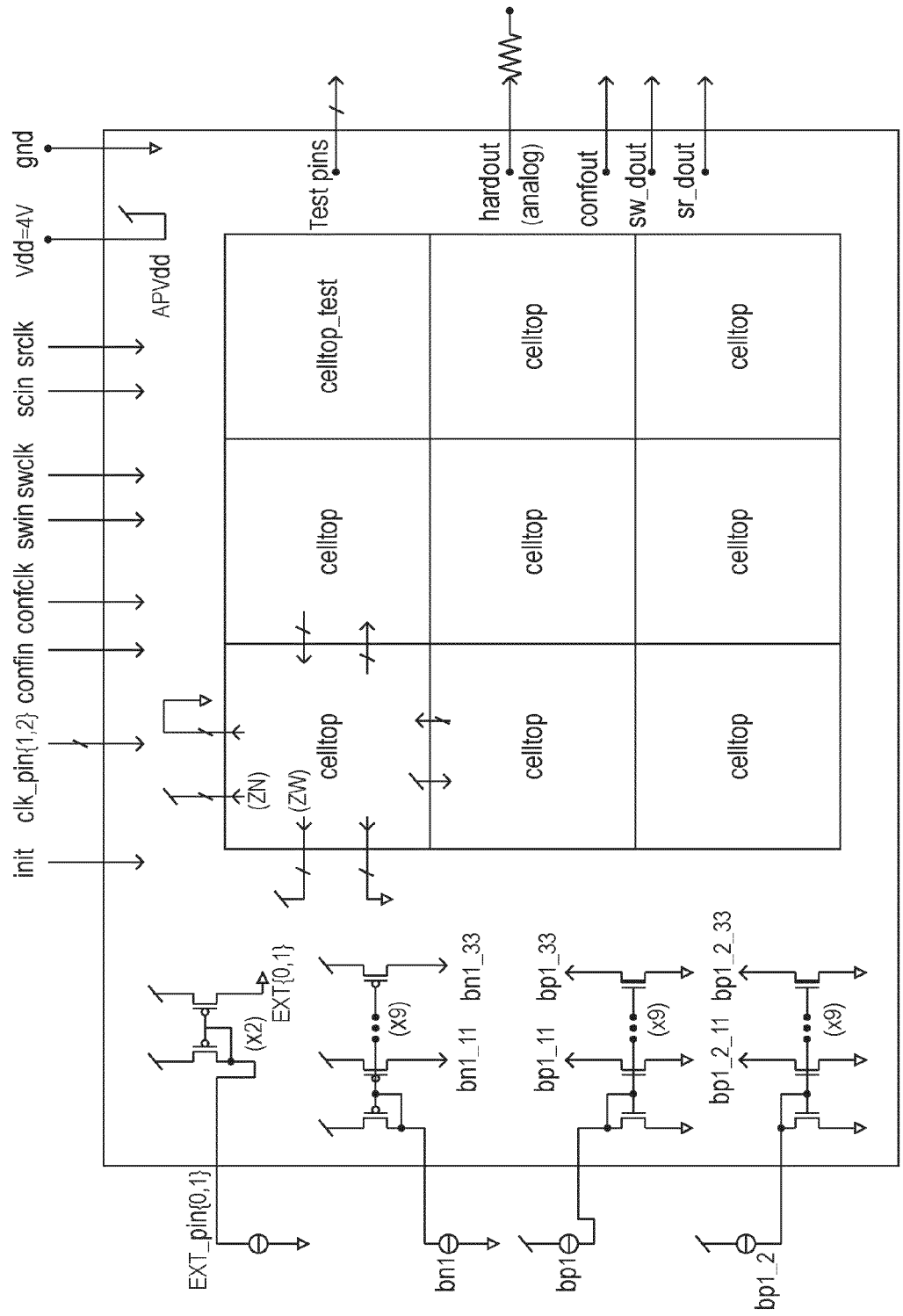
FIG. 7 is a diagram of an embodiment of an exemplary 3-by-3 cellular automata array, according to one aspect of the present invention.
Figure 8:
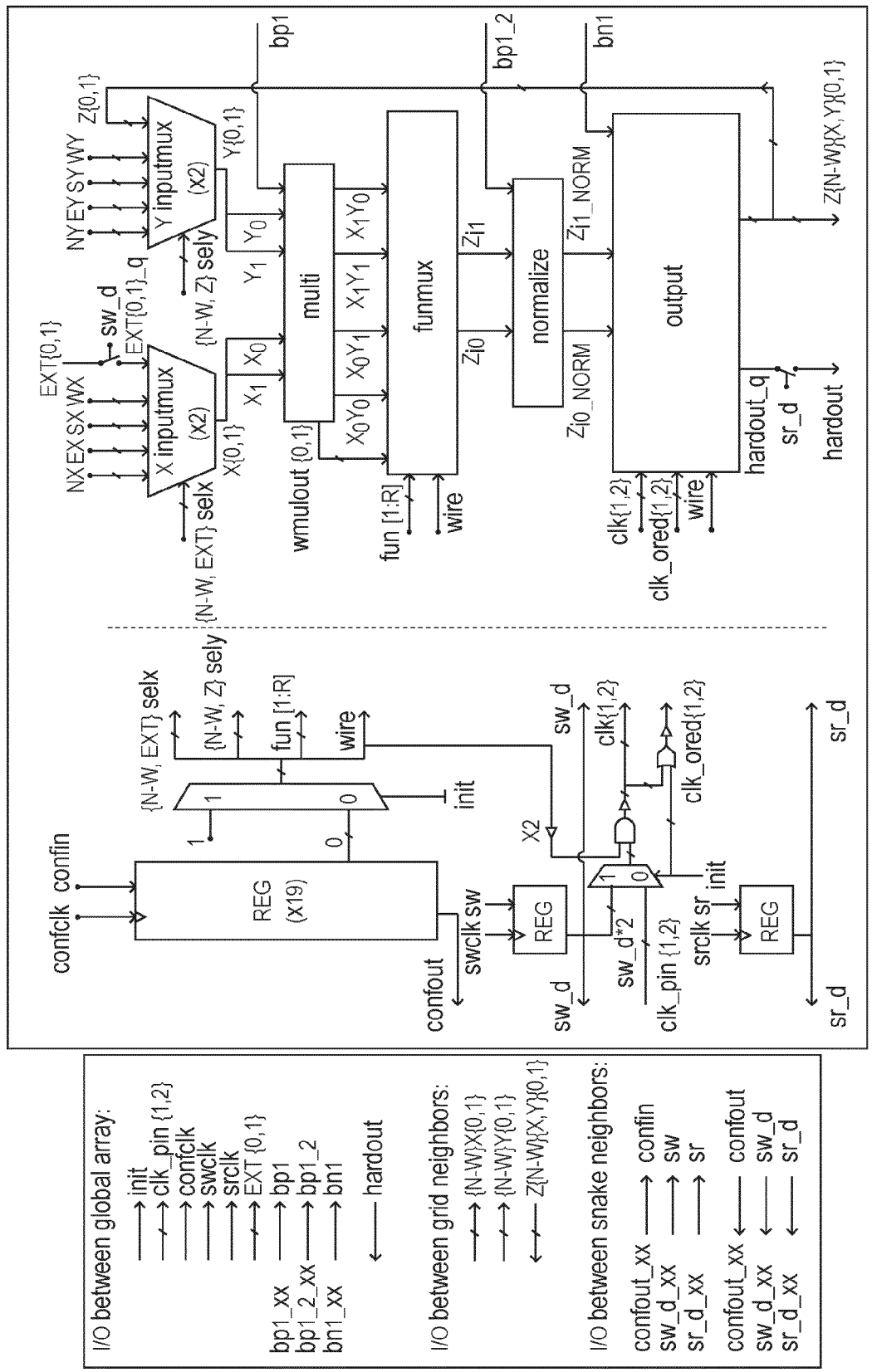
FIG. 8 is a functional block diagram of an exemplary embodiment of one cellular automata cell, according to one aspect of the present invention.

In an array, the output of each cell is fed to its four rectangular neighbors. A block diagram of an exemplary 3-by-3 cellular automata array implemented according to the principles of the invention is shown in FIG. 7. A functional block diagram of an exemplary single automata cell implemented according to the principles of the invention is shown in FIG. 8.

Figure 9:
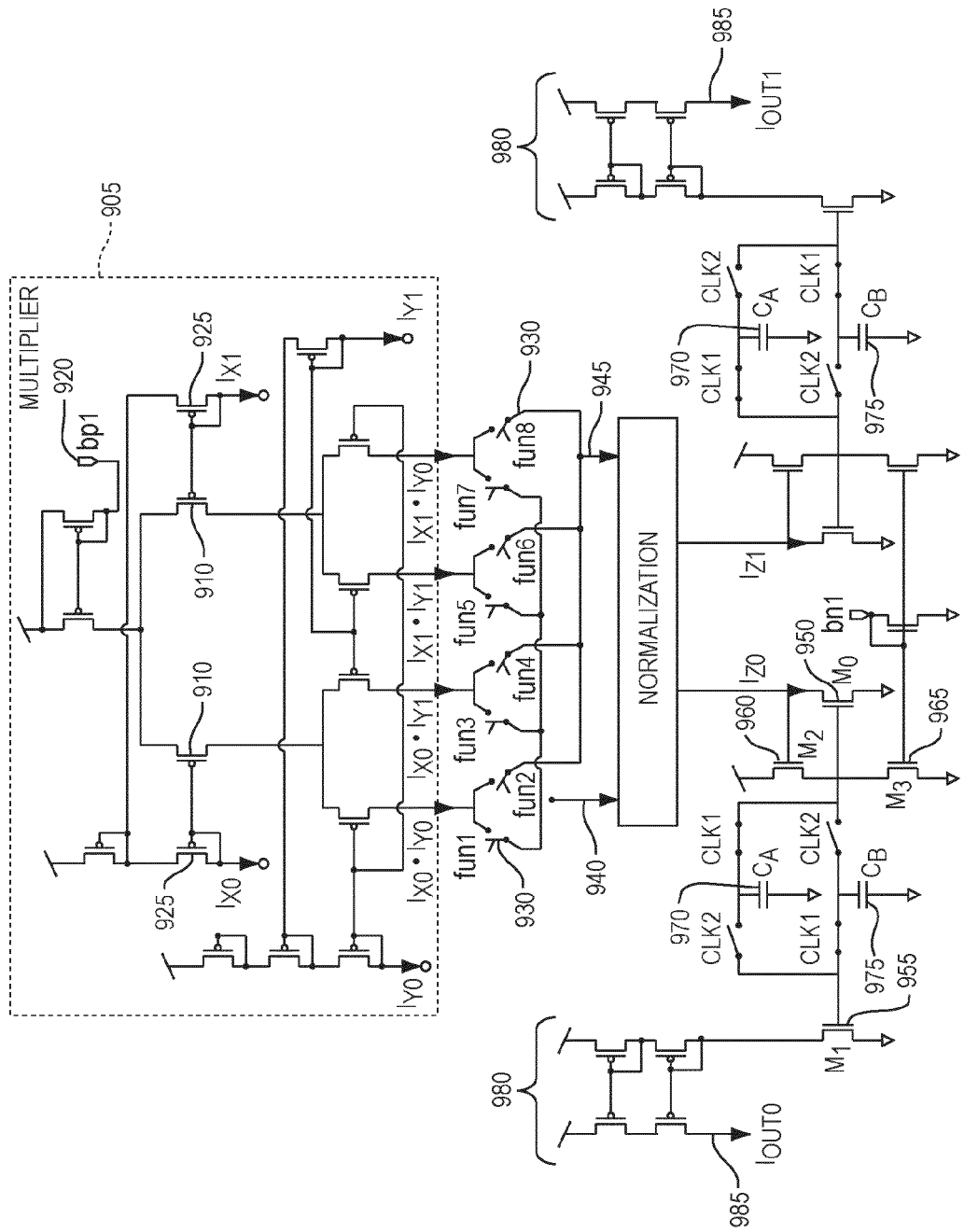
FIG. 9 is a core schematic of an exemplary embodiment of a programmable Analog Logic Automata cell implementation.

It will further be clear to one of skill in the art that a programmable soft gate can be made by selectively steering and merging the four Gilbert Multiplier output currents with eight switches before the normalization and gate outputs. This switching scheme guarantees full function programmability. A schematic of an implementation of an exemplary single Analog Logic Automata cell is shown in FIG. 9. In FIG. 9, to implement multiplier 905, sub-threshold MOS transistors 910 are employed in a translinear configuration. This implies that the current density must be small, and thus the tail current 920 ($I_{bp1}$) of multiplier 905 and the transistor sizes are designed accordingly. Also, diode connected transistors 925 are added to the sources of the input current mirrors, so that all transistors in the translinear circuit are saturated for accurate multiplication.

After passing through the eight switches 930 that determine the functionality, the two output current values 940, 945 representing the cell state need to be stored, and then driven to neighboring cells at the next clock phase. $M_0$ 950 and $M_1$ 955 must be well matched, and the capacitor that stores the gate voltage must be much greater than the gate parasitic capacitance of $M_{1\ 955}$. In order to charge and discharge the large capacitor within a clock phase, $M_2$ 960 and $M_3$ 965 are added, to form a "super-buffer" with low output impedance. When the current going into $M_0$ 950 suddenly increases, the gate voltage of $M_2$ 960 jumps up. Now $M_2$ 960 puts more current into the capacitor than $M_3$ 965 draws, charging it up. When the current going into $M_0$ 950 suddenly decreases, the gate voltage of $M_2$ 960 drops, which weakens $M_2$ 960, so the capacitor discharges. In the test chip, the gate voltage of $M_3$ 965 was adjustable in order to ensure the stability of the super-buffer. In the first clock phase, capacitor A 970 ($C_A$) is being written into, and capacitor B 975 ($C_B$) is connected to the gate of $M_1$ 955, which goes through cascade current mirrors 980 to send the output currents 985 to the neighbor cells. In the next clock phase, $C_B$ 975 is being written into, and $C_A$ 970 is connected to $M_1$ 955. This produces the functionality described in the cell architecture.

An alternative way to view the present invention is from the mathematical programming point of view. Programming a traditional, i.e. Boolean, cellular automata array with a certain update rule for a particular signal processing problem is the mathematical equivalent of a constraint optimization problem with all of the variables being binary and the constraints being combinatorial. However, the introduction of analog logic and a message-passing algorithm replaces the binary variables with probabilistic messages containing information about those variables, which in turn effectively relaxes the combinatorial constraints into continuous ones, thus turning the problem into a relaxed optimization problem.

By exploiting the new degree of freedom in the state value of each cell of the cellular automata cellular automata, higher speed, lower power, and better efficiency in Analog Logic Automata can be attained. The reason for the power saving and efficiency enhancement is that the invention performs signal processing in analog domain, as opposed to the common practice of carrying out signal processing after truncating quantizing input signal into digital domain, thus discarding a huge amount of potentially useful information. This information is preserved and exploited in Analog Logic Automata for subsequent analog signal processing.

The Analog Logic Automata of the present invention are always compatible with traditional digital signal processing hardware, because the output signal can be converted into the digital domain easily. Therefore, the present invention can be very efficient when working on digital signal processing tasks. Moreover, the principles described herein apply equally to clocked and asynchronous (un-clocked) automata. While clocked Analog Logic Automata are primarily described herein, it will be clear to one of skill in the art that an improved asynchronous version of Automata, in which power savings and speed enhancement would become even more evident, is also within the scope of the present invention, as all the principles described here apply equally to un-clocked automata. The asynchronous model keeps the same states and computation, but further localizes time by removing the global clock. Asynchronous Logic Automata have recently been reported in D. A. Dalrymple, N. Gershenfeld, and K. Chen, "Asynchronous logic automata," Proceedings of AUTOMATA 2008 (14th International Workshop on Cellular Automata), pp. 313-322, June 2008 and are further described in co-pending U.S. patent application Ser. No. 12/422,979, "Asynchronous Logic Automata", filed Apr. 13, 2009, the entire disclosure of which is herein incorporated by reference.

It should be understood by one of skill in the art of the invention that Analog Logic Automata are not field programmable analog arrays [see, e.g., T. S. Hall, C. M. Twigg, J. D. Gray, P. Hasler, and D. V. Anderson, "Large-scale field-programmable analog arrays for analog signal processing," Circuits and Systems I: Regular Papers, IEEE Transactions on, vol. 52, no. 11, pp. 2298-2307, November 2005], in that Analog Logic Automata conceptually work in digital space with analog representations. This architecture is also different from FPGA because Analog Logic Automata interconnects are completely local, in contrast to the global connections in FPGA. Thus, a systematic Analog Logic Automata design flow for distributed analog systems modeling can be set up to improve neuromorphic application development, such as signal processing in the retina [C. Mead, "Neuromorphic electronic systems," Proceedings of the IEEE, vol. 78, no. 10, pp. 1629-1636, October 1990] or neural networks [L. O. Chua, "CA belongs to CNN," invited talk at AUTOMATA 2008 (14th International Workshop on Cellular Automata), June 2008]. For example, the parallel Analog Logic Automata can be integrated into the image sensor array chip of the wireless capsule Gastrointestinal (GI) endoscopy [Meng-Chun Lin, Lan-Rong Dung, and Ping-Kuo Weng, "An ultra-low-power image compressor for capsule endoscope", BioMedical Engineering OnLine, vol. 5, no. 1, pp. 14, 2006]. This Analog Logic Automata pre-processing is low-power, real-time, and makes data compression more efficient, reducing the transmission overhead. Applications in telemetric communication and decoding have also been found because of Analog Logic Automata's programmability and power efficiency.

The potential applications of this invention are myriad. In principle, any problem that can be solved by local message-passing algorithms (or sum-product algorithm) may be formulated and solved on this hardware. The first application prototyped was a reconfigurable noise-locked loop (NLL). However, many other decoding algorithms, such as, but not limited to, Viterbi decoding and Kalman Filter, can be formulated as message-passing algorithms [F. R. Kschischang, B. J. Frey, and H.-A. Loeliger, "Factor graphs and the sumproduct algorithm", IEEE Trans. Inform. Theory, 47:498-519, February 2001]. Therefore, it will be clear to one of skill in the art of the invention that the Analog Logic Automata arrays of the present invention can implement these algorithms as well. The programmability of the invention provides maximum convenience for implementing as many algorithms as possible.

The Noise-Locked Loop (NLL) is a generalization of the Phase-Locked Loop (PLL) [B. Vigoda, Analog Logic: Continuous-Time Analog Circuits for Statistical Signal Processing, Ph.D. thesis, Massachusetts Institute of Technology, June 2003]. Instead of synchronizing to a signal oscillating between two extreme values, an NLL relaxes this constraint and can synchronize to a more complex periodic pattern produced by a given Linear Feedback Shift Register (LFSR). By softening the components in the LFSR and adding a soft EQUAL gate, the corresponding NLL that synchronizes to a pseudorandom signal is obtained. Based on the architecture, the implementation of a reconfigurable NLL is straightforward. In particular, one can flexibly change the configuration of a NLL by programming the connectivity and function of each cell in the array.

Figure 10:
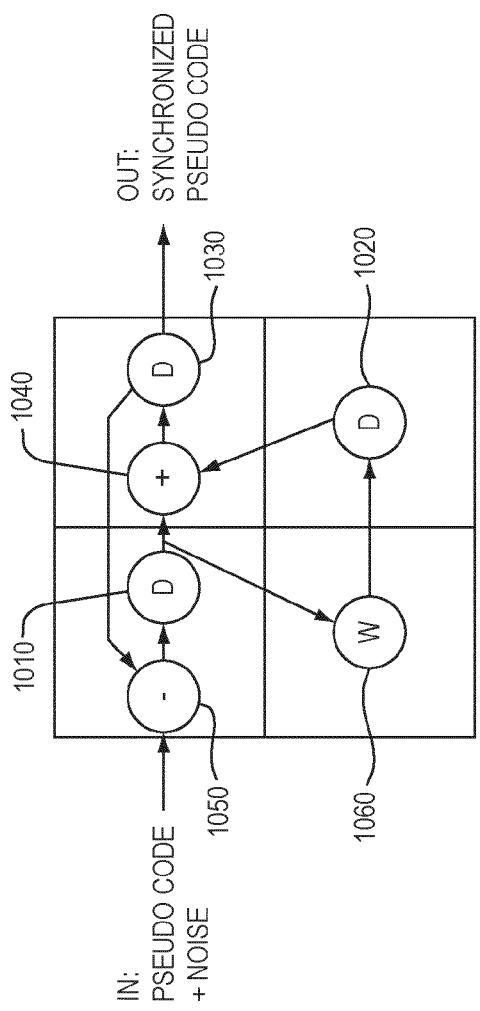
FIG. 10 depicts the configuration of an exemplary embodiment of a cellular automata array for implementing a Noise-Locked Loop (NLL) with four cells, according to one aspect of the present invention.
Figure 11:
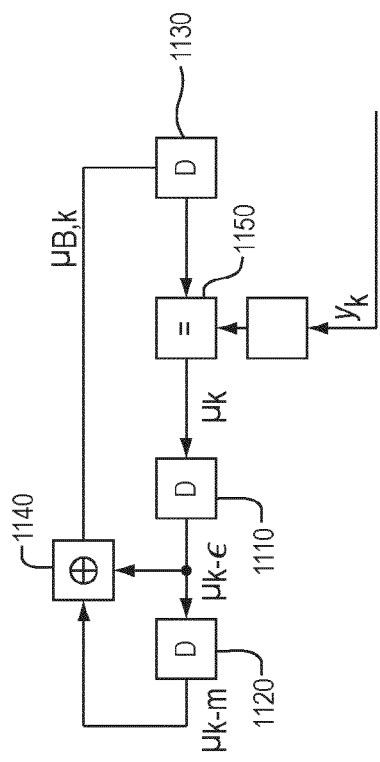
FIG. 11 is a synchronization block diagram for an exemplary embodiment of a Linear Feedback Shift Register (LFSR) corresponding to the cellular automata embodiment of FIG. 10.

One embodiment of such kind of reconfigurable NLL realizes a NLL built with 4 cells, as shown in FIG. 10. The four cells are programmed to perform different functions, while maintaining different interconnection with its neighbors. In FIG. 10, "D" denotes delay elements 1010, 1020, 1030, which are an intrinsic characteristic of every cell, except the ones performing "wire" function. "+" denotes soft XOR gate 1040, "=" denotes soft "EQUAL" gate 1050, and "w" denotes bypassing "wire" gate 1060. A "wire" cell facilitates "diagonal" interaction as a compensation for the fact that the cellular automata array only has rectangular neighbor connections. The circuit of FIG. 10 is functionally equivalent to the LFSR synchronization block diagram shown in FIG. 11, wherein the functionality of the "D"1110, 1120, 1130, "+" 1140, and "=" 1150 elements are the same as for the correspondingly labeled elements in FIG. 10.

Figure 12:
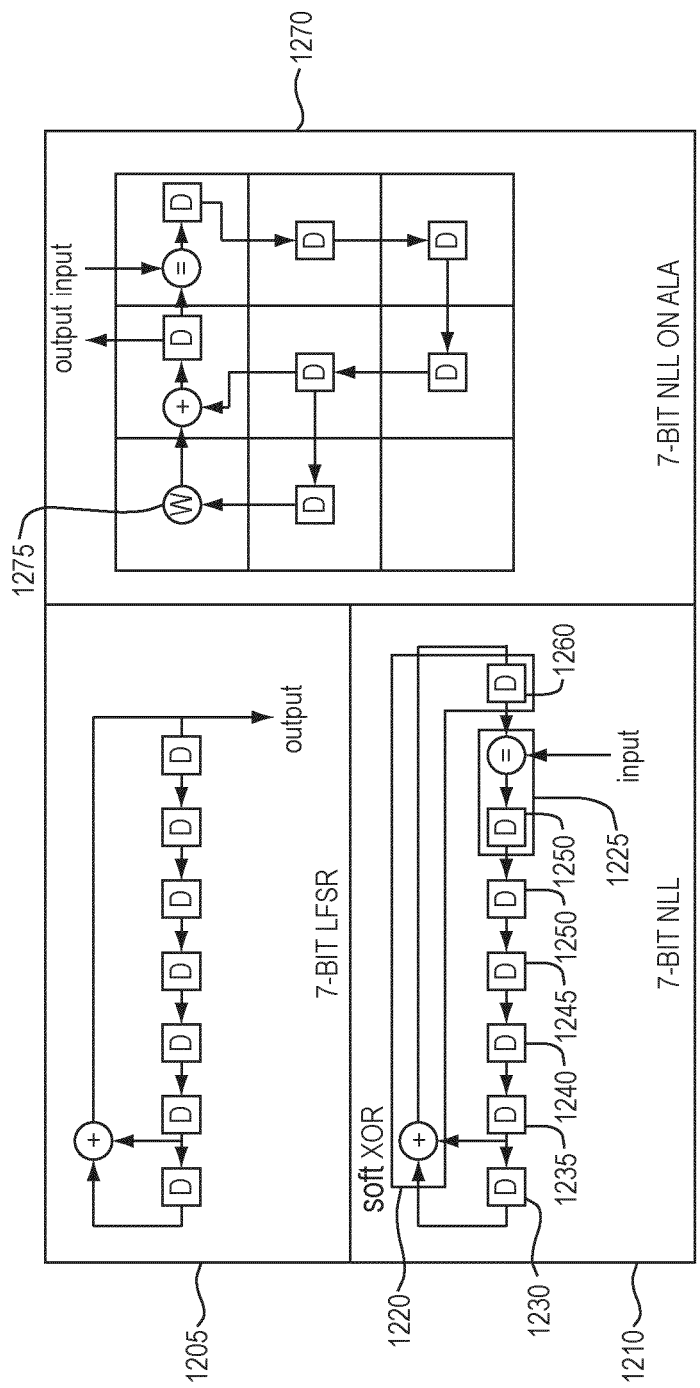
FIG. 12 depicts the configuration of an exemplary embodiment of a 7-bit Noise-Locked Loop implemented on a 3-by-3 Analog Logic Automata, according to one aspect of the present invention.

Low-power, biomedical, decoding, and communication applications have been developed. A 3×3 ALA chip was prototyped, which works at 50 kHz, with a power consumption of 64 μW, and was tested as a programmable Noise-Locked Loop (NLL) for direct-sequence spread-spectrum communication at an SNR of −6.87 dB. Within the 3×3 Analog Logic Automata framework, different LFSR transmitters can be matched with corresponding NLL receivers up to 7-bit long by changing the array configuration. FIG. 12 depicts the prototype 7-bit NLL implemented on a 3×3 Analog Logic Automata. In FIG. 12, 7-bit LFSR transmitter 1210 and NLL receiver 1215 are paired. Analog Logic Automata cell 1220 performs a soft XOR function and cell 1225 performs a soft EQUAL function with unit delays 1230, 1235, 1240, 1245, 1250, 1255, 1260, denoted by "D". In the actual implementation 1270 on the Analog Logic Automata, cell 1275 is configured as a WIRE gate, denoted by "W". The WIRE function bypasses the input directly to the output without any delay. It is introduced for more routing flexibility in the rectangular-connection-only array.

In another application, a Forward-backward Algorithm for Decoding is used for bitwise Maximum APosteriori (MAP) Error Correcting Code (ECC) decoding. It is solved by passing and merging forward and backward messages on a trellis [D. MacKay, Information Theory, Inference, and Learning Algorithms, Cambridge University Press, 2003], which is easily mapped onto the ALA architecture. In principle, all ECC codes can be decoded by ALA circuits implementing trellis decoding. As an example, a (7, 4) Hamming Code decoder on 61×63 ALA was designed and simulated. Soft AND gates were used to calculate multiplying terms and 7 soft UNEQUAL gates were used for bitwise decoding decision. Simulation showed that the decoding process takes 56 clock cycles and the results agree with standard decoding algorithm. Because both the Analog Logic Automata decoder and the NLL for pseudorandom signal synchronization can be more power-efficient than their counterparts in a digital receiver, they can be applied in low-power portable biomedical devices or telemetric links for implantable sensors.

Another suitable application is statistical image processing [see, e.g., U.S. Pat. No. 4,916,745; U.S. Pat. No. 5,386,829; U.S. Patent App. Pub. No. US2007/0022067]. Mapping an image onto the cellular automata array, with a configuration of Bayesian image processing algorithm [Kazuyuki Tanaka, Junichi Inoue and D. M. Titterington, "Probabilistic Image Processing by Means of Bethe Approximation for Q-Ising Model", Journal of Physics A: Mathematical and General, Vol. 36, No. 43 (October 2003), pp. 11023-11036; Kazuyuki Tanaka, "Statistical-Mechanical Approach to Image Processing" (Topical Review), Journal of Physics A: Mathematical and General, Vol. 35, No. 37, September 2002, pp. R81-R150], binary image restoration can be realized.

A particular image processing application implementable using the present invention is grey-level image processing. The mapping is from a grey-level image to the cellular automata array. With each cell representing a grey-level pixel, the Analog Logic Automata unit becomes a programmable image processor. Three simple examples were simulated, which might be used, for example, in wireless capsule GI endoscopy or other low-power biomedical image processing applications. The normalized grey level of each pixel on the image is represented by the analog state $P_X(1)$ of a corresponding cell in the cellular automata array.

Low-pass filtering (segmentation) of an image can be achieved by doing the operation of soft EQUAL, which depicts the similarity between a pixel and the average of its 4 neighbors. In that particular setting, each cell's inputs X and Y are selected as:

$$P_X(1)=P_{Z\_(t-1)}(1)$$

$$P_Y(1)=[P_A(1)+P_B(1)+P_C(1)+P_D(1)]/4$$

Figure 13:
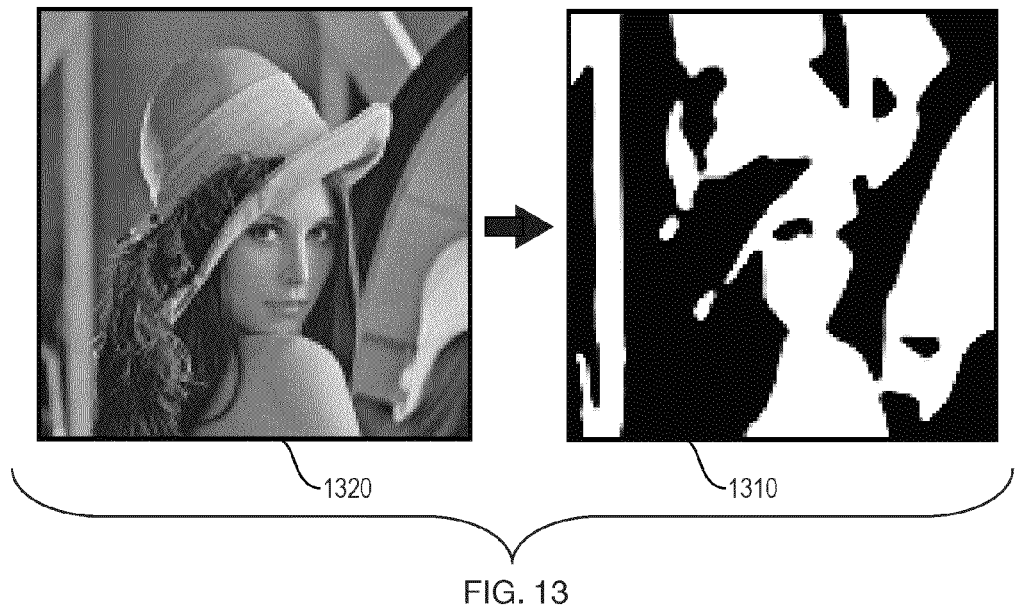
FIG. 13 depicts MATLAB simulation results of a low-pass filtering effect on a test image.

In which A, B, C, D are rectangular neighbors of the center cell Z. Each time step, the center cell Z does soft EQUAL operation and updates its state. A MATLAB simulation, shown in FIG. 13, depicts the low-pass filtering effect 1310 on a standard test image 1320 after 10 iterations (clock cycles).

Figure 14:
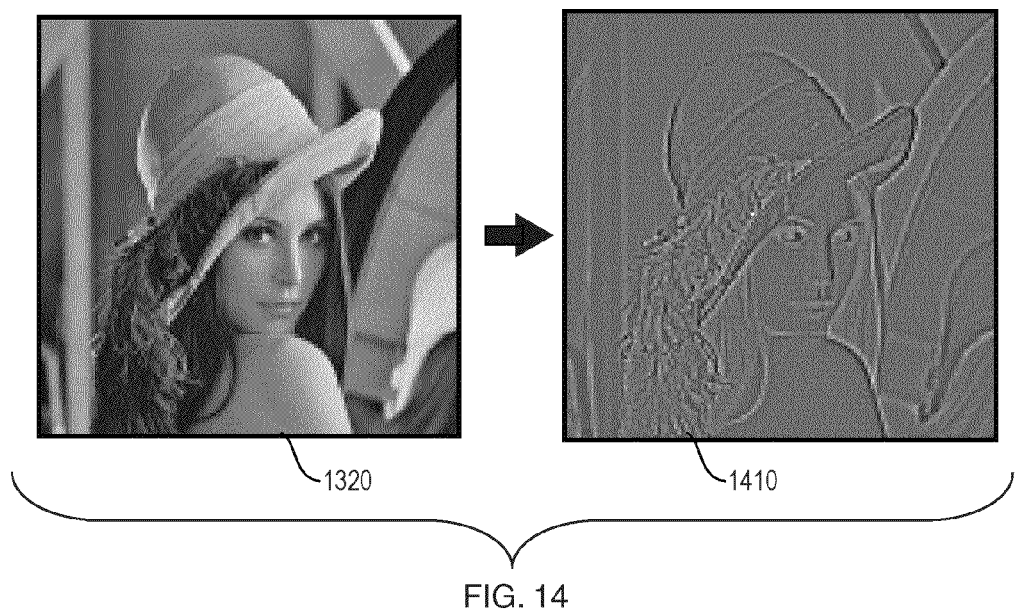
FIG. 14 depicts MATLAB simulation results of a high-pass filtering effect (edge-detection in one time-step) on a test image.

Similarly, edge enhancement (high-pass filtering) is achieved by the soft UNEQUAL operation, depicting the difference between a pixel and its four surrounding neighbors. In this particular setting, each cell's inputs X and Y are selected as:

$$P_X(1)=P_{Z\_(t-1)}(1)$$

$$P_Y(1)=[P_A(1)+P_B(1)+P_C(1)+P_D(1)]/4,$$

in which A, B, C, D and Z have the same definition as in the low-passing filtering application. Each time step, the center cell Z does the soft UNEQUAL operation and updates its state. A MATLAB simulation, shown in FIG. 14, reveals a good edge detection effect 1410. Due to the unique distributed architecture of cellular automata array, permitting parallel computation, the edge enhancement of the image is fulfilled in only one iteration (clock cycle). Motion detection can be similarly implemented by detecting the difference between two consecutive video frames. This is accomplished by performing the soft UNEQUAL function between two images, pixel by pixel.

Figure 15:
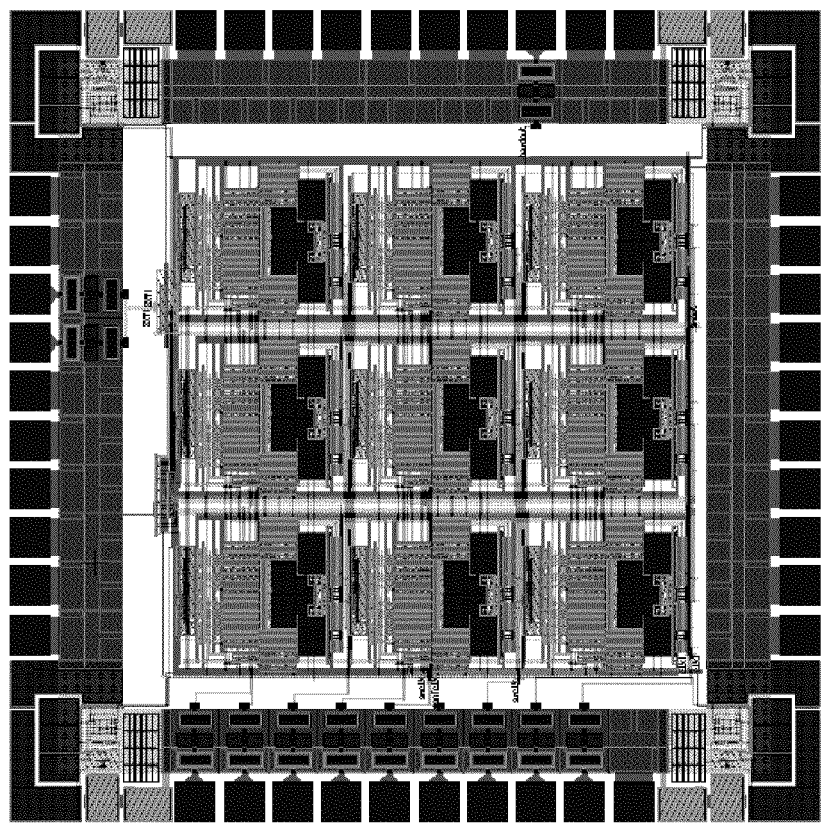
FIG. 15 depicts the physical layout of a 3-by-3 test chip fabricated in AMI 0.5 um process, with a voltage supply of 4.0V, according to one aspect of the present invention.

In a prototype embodiment, a 3×3 cellular automata array was fabricated in silicon. A 3×3 ALA chip was fabricated in the AMI 0.5 μm CMOS process, with an area of 1.5×1.5 mm² and 4V voltage supply. The array can work at 50 kHz and the power consumption is 64 μW, including both digital and analog circuits. The die photo in FIG. 15 depicts the layout of the chip in AMI 0.5 um process, with a voltage supply of 4.0V. The circuit simulation in HSPICE shows a 1 uA DC current consumption (excluding digital control circuitry) per cell and the array could work at 50 kHz.

Figure 16:
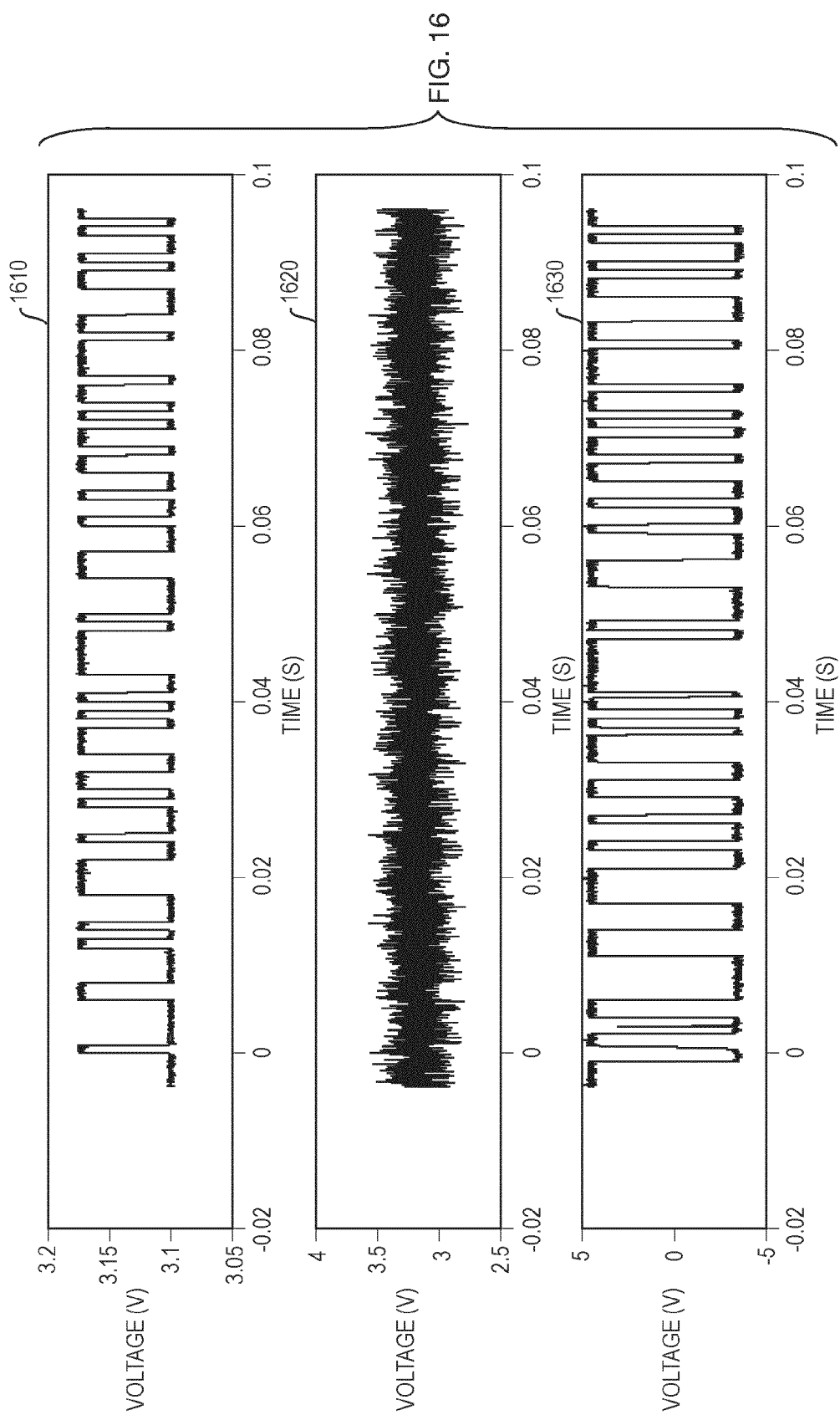
FIG. 16 depicts experimental results for locking and tracking dynamics obtained using a noise-locked loop implemented according to FIG. 12.
Figure 17:
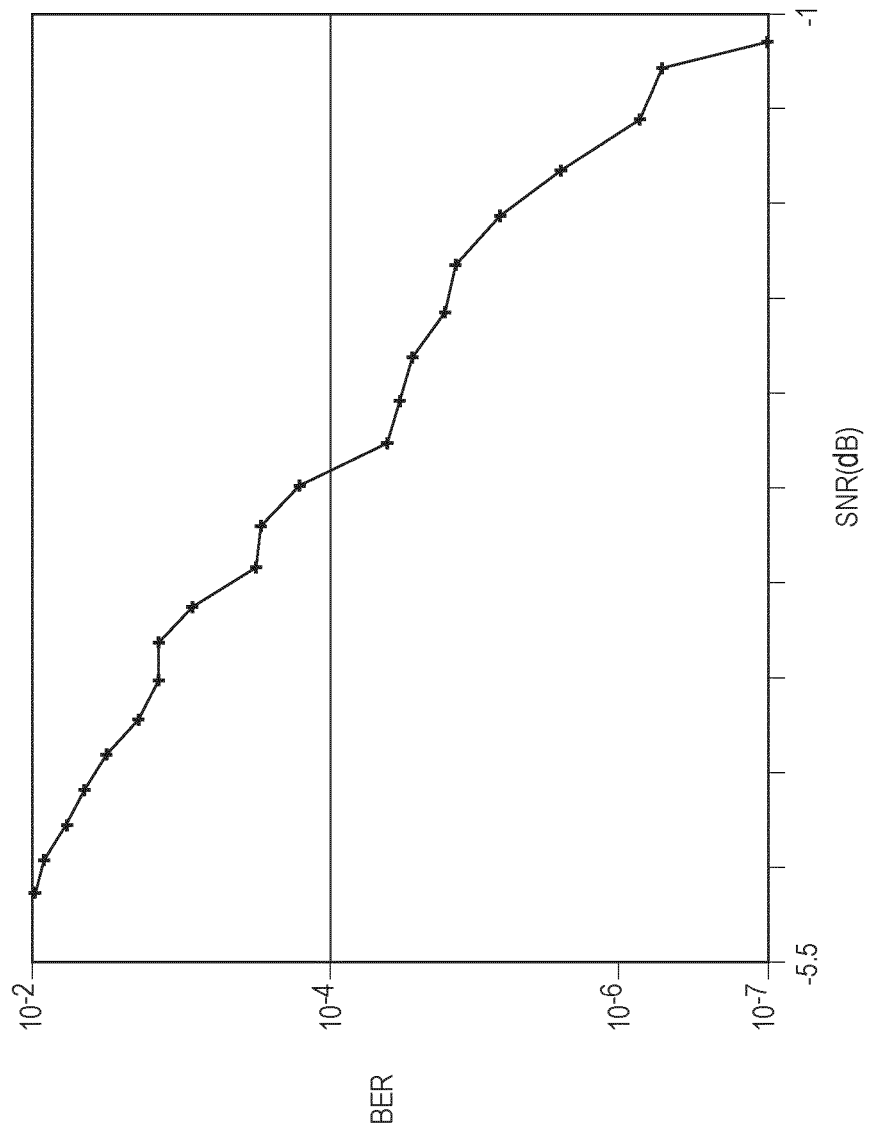
FIG. 17 is a plot of experimentally-obtained Bit-Error-Rate vs. Signal-to-Noise Ratio for a noise-locked loop implemented according to FIG. 12.

The 3×3 Analog Logic Automata chip was tested for programmable 3-bit to 7-bit NLL applications, implemented according to FIG. 12, and shown to work correctly. The experimentally-obtained 7-bit NLL locking and tracking dynamics are shown in FIG. 16, in which the three waveforms are an attenuated version of the clean pseudorandom signal 1610 generated by the 7-bit LFSR, the noisy pseudorandom signal 1620 corrupted by white Gaussian noise, which is the input of the 7-bit NLL, and the 7-bit NLL output signal 1630, which is clearly synchronized to the LFSR. It can be seen that the NLL locked onto input signal 1610 after 43 clock phases. In this measurement, the input signal current swing was 47.4 nA. The measured lowest SNR is −6.87 dB, as shown in FIG. 17, which is a plot of experimentally-obtained Bit-Error-Rate (BER) vs. Signal-to-Noise Ratio (SNR).

Analog Logic Automata is a low-power, parallel, and programmable hardware, which is a relaxation over logic automata using analog logic gates, while preserving re-configurability. The new circuits provide a wide range of applications spanning biomedical image processing, digital communication, and decoding. The Analog Logic Automata circuits of the invention promise great potential in many research fields. Firstly, this architecture offers a new approach to a better neuromorphic design. Secondly, more complex image processing algorithms can be developed and used in different biomedical applications, given this highly programmable hardware. Thirdly, the Analog Logic Automata architecture suggests a new way to realize Software Defined Radio (SDR). Instead of first digitizing the RF signal and then processing the signal digitally, Analog Logic Automata circuits can directly obtain the baseband signal through analog computation, only digitizing at the output. Finally, Analog Logic Automata can implement decoders for other types of ECC codes decodable in similar message-passing algorithms, such as turbo codes and low-density parity-check codes. Overall, an Analog Logic Automata receiver is suitable for low-power wireless applications, and in general, the Analog Logic Automata architecture is promising as a versatile platform for fast algorithm/application development.

Analog Logic Automata according to the present invention provide a distributed, reconfigurable computation model for statistical signal processing. Based on implementing analog logic circuitry, which works on analog signals, and timed by a global clock on the reconfigurable cellular automata architecture, various statistical/digital signal processing tasks can be completed. Because the local message-passing algorithms on analog logic and the cellular automata model share the same feature of locality, the invention merges the common feature of analog logic and cellular automata together, while taking advantage of both high processing efficiency of analog logic circuits and flexibility/re-configurability of the cellular automata architecture.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A distributed, reconfigurable statistical signal processing apparatus, comprising:
   an array of discrete-time analog signal processing circuits for statistical signal processing, wherein the analog signal processing circuits are arranged into a network such that each analog signal processing circuit is configured to communicate with neighboring analog signal processing circuits according to a local message-passing algorithm and wherein each analog signal processing circuit comprises:
   at least one computational element; and
   at least one digital configuration circuit, each digital configuration circuit being configured for programming a logic function implemented by the analog signal processing circuit; and
   a receiving module connected to the array of analog signal processing circuits, the receiving module being configured for assigning probability values when an input signal arrives at the array of analog signal processing circuits and for communicating the assigned probability values to at least a first one of the analog signal processing circuits in the array, wherein the computational elements are configured by the digital configuration circuits to produce outputs based on assigned probability values.

2. The apparatus of claim 1, wherein each assigned probability value communicated from the receiving module to the array is a probabilistic representation.

3. The apparatus of claim 1, wherein input signals received at the array of analog signal processing circuits are processed by the analog signal processing circuits according to the logic functions programmed by the digital configuration circuits.

4. The apparatus of claim 3, wherein the digital configuration circuits program the analog signal processing circuits to employ a local message propagation algorithm.

5. The apparatus of claim 4, wherein the apparatus is configured to provide dynamic synchronization to an output of a Linear Feedback Shift Register signal generator.

6. The apparatus of claim 4, wherein the apparatus is configured to perform low-pass filtering of a grey-level image.

7. The apparatus of claim 4, wherein the apparatus is configured to perform high-pass filtering of a grey-level image.

8. The apparatus of claim 1, wherein at least some of the computational elements are soft gates.

9. An analog logic automata cell, comprising:
   a discrete-time analog signal processing circuit, wherein the analog signal processing circuit is configured to communicate with neighboring analog signal processing circuits according to a local message-passing algorithm and wherein each analog signal processing circuit comprises:
   at least one computational element;
   at least one digital configuration circuit configured for programming a logic function implemented by the analog signal processing circuit; and
   a receiving module configured for assigning probability values when an input signal arrives at the analog signal processing circuit and for communicating the assigned probability values to at least a first one of the computational elements, wherein the computational elements are configured by the digital configuration circuit to produce outputs based on assigned probability values.

10. The analog logic automata cell of claim 9, wherein at least some of the computational elements are soft gates.

11. An array of analog logic automata cells according to claim 10, wherein each cell within the analog logic automata cell array has neighboring cells within the array and is configured for communication with all neighboring cells within the array.

12. An analog logic automata array, comprising:
   an array of analog logic automata cells, wherein the cells are arranged into a network such that each cell is configured for communication with neighboring cells within the array, each cell comprising:
   a discrete-time analog signal processing circuit, the analog signal processing circuit being configured to communicate with neighboring cells according to a local message-passing algorithm, the analog signal processing circuit comprising:
   at least one computational element; and
   at least one digital configuration circuit, each digital configuration circuit being configured for programming a logic function implemented by the analog signal processing circuit; and
   a receiving module connected to the array of analog logic automata cells, the receiving module being configured for assigning probability values when an input signal arrives at the array of analog logic automata cells and for communicating the assigned probability values to at least a first one of the analog logic automata cells, wherein the computational elements are configured by the digital configuration circuits to produce outputs based on assigned probability values.

13. The analog logic automata array of claim 12, wherein at least some of the computational elements are soft gates.

* * * * *